April 21, 1925.  
W. L. MARDEN  
1,534,128  
APPARATUS FOR MEASURING LIQUIDS  
Filed Jan. 9, 1923
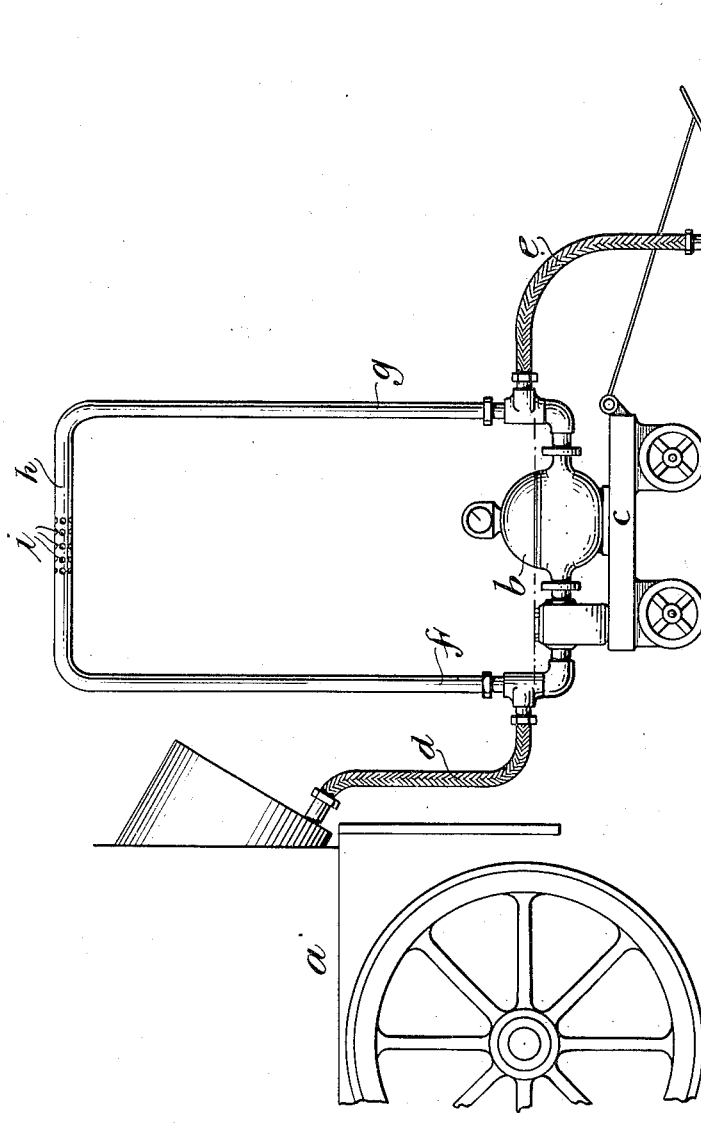

Patented Apr. 21, 1925.

1,534,128

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

APPARATUS FOR MEASURING LIQUIDS.

Application filed January 9, 1923. Serial No. 611,572.

*To all whom it may concern:*

Be it known that I, WILLIAM L. MARDEN, a citizen of the United States, residing in the borough of Manhattan, of the city of New York, in the State of New York, have invented certain new and useful Improvements in Apparatus for Measuring Liquids, of which the following is a specification, reference being had to the accompanying drawings, forming a part hereof.

It is common to deliver certain liquids, such as gasoline, from a tank or delivery wagon to an underground tank through a meter which is interposed in the connection, usually a flexible hose, between the tank or delivery wagon on the one side and a receiving tank on the other side. It has been found that the volume of air contained within the hose or connection between the tank or delivery wagon and the meter is driven through the meter before the liquid when the valve on the tank or delivery wagon or other source of supply is opened, causing the meter to register. So also has it been found that when the last of the liquid runs from the hose or connection between the meter and the receiving tank, which is at a lower level, the suction draws air through the meter, causing it to register. The quantity of liquid actually delivered is therefore less than that shown by the meter. It is the object of this invention to provide means for preventing the operation of the meter by the air, as above described, either on one side or on the other side, and in accordance with the invention there is connected to the delivery pipe or hose, in proximity to the meter, an air outlet, preferably as a stand pipe rising to a level as high as the top of the source of supply, so that the air in the supply pipe shall escape without being driven through the meter. There is also provided in the discharge pipe, between the meter and the receiving tank, in proximity to the meter, an air inlet through which air is admitted, as the last of the liquid runs from the meter, so as to break the vacuum which would otherwise be caused by the flow of liquid into the lower receiving tank. This air inlet, in order to prevent the possible overflow or waste of liquid, is also preferably in the form of a stand pipe and it may be connected, if desired, to the air outlet on the other side of the meter, forming a by-pass through which air may pass around the meter without causing the meter to be operated. The invention will be explained more fully hereinafter with reference to the accompanying drawing, the single figure of which shows in elevation a meter provided with a convenient embodiment of the invention, a portion of a delivery wagon or source of supply and the connections from the delivery wagon to the meter and from the meter to the receiving tank.

In the embodiment of the invention illustrated in the drawing there is illustrated a portion of a tank or delivery wagon $a$, a meter $b$ which may be of any suitable construction and is shown as mounted on a truck $c$ for convenience in handling, a hose or pipe connection $d$ through which the gasoline or other liquid is delivered from the source of supply and a discharge pipe or hose $e$ through which the gasoline or other liquid is delivered from the meter to the receiving tank which is not necessary to be shown and is presumed to be at a lower level than the meter. The connecting pipes $d$ and $e$ are provided with the usual coupling devices which are not necessary to be described.

At a suitable point in the connection between the source of supply and the meter, there is provided an outlet for the air which is driven through the connection $d$ when the flow of liquid from the source of supply begins. In the embodiment of the invention illustrated this air outlet is shown as a stand pipe $f$ which preferably rises to a point $h$ at the level of the liquid in the source of supply so that there shall be no spilling of any of the liquid. There is also provided in the discharge connection $e$, also preferably in proximity to the meter, an air inlet which preferably takes the form of a stand pipe $g$ so as to prevent the spilling of any of the liquid. Such stand pipe is shown as rising to a point above the highest level of the level in the source of supply, although it does not necessarily rise to that height. The two stand pipes $f$ and $g$ may be conveniently connected together as shown at $h$ and openings are provided, as at $i$, for the escape of air from the one side of the meter and the admission of air on the other side of the meter.

It will be understood that when the flow of liquid from the source of supply is started, as by opening the valve of a tank or by tilting a container, the air in the connection $d$, driven ahead of the liquid, will escape through the outlet $f$ and therefore will not be forced through the meter. It will be understood that provision for the escape of the air might be made in different ways, but for simplicity in construction and efficacy in preventing the spilling of liquid, it is preferable to provide a stand pipe as shown. It will further be understood that as the last of the flow of liquid runs from the meter toward the receiving tank, the air admitted through the air inlet $g$ will break the vacuum otherwise caused by the rush of the liquid into the lower receiving tank and so will prevent the drawing of air through the meter. By such means the meter is made to register with substantial accuracy the actual quantity of liquid delivered from the source of supply to the receiving tank.

I claim as my invention:

An apparatus for measuring liquid in its flow from one point to another comprising in combination a source of liquid supply, a meter, a truck on which the meter is mounted, a pipe connection from the source of supply to the meter, a discharge pipe from the meter, stand pipes connected respectively to said pipe connection and said discharge pipe in proximity to the meter to permit the free discharge of air from said pipe connection and the free admission of air to said discharge pipe, and a perforated pipe connecting said stand pipes.

This specification signed this 5th day of January, A. D. 1923.

WILLIAM L. MARDEN.